3,322,502
MAGNESIUM HYDROXIDE AND METHOD OF PREPARATION

Philip Westwood Trubey, Hull, Quebec, Lawrence Hanna, Wakefield, Quebec, Arthur D. Gordon, Montreal, Quebec, and Arthur C. Turney, Richelieu, Quebec, Canada, assignors to Aluminium Laboratories Limited, Montreal, Quebec, Canada, a corporation of Canada
No Drawing. Filed Sept. 24, 1963, Ser. No. 311,245
6 Claims. (Cl. 23—201)

This invention relates to a magnesium hydroxide product and to a method of producing the same. In a particular sense, the invention is concerned with the provision of magnesium hydroxide in a form characterized by unusually high reactivity and markedly superior sintering and other properties.

Magnesia (i.e. magnesium oxide, MgO) is widely employed as a refractory material, being incorporated into bricks for open hearth furnaces, oxygen converters, and the like, and into other types of refractory products such as ramming mixes, gunning mixes, and plastic cements. For such purposes, it is necessary that the magnesia be in the so-called periclase lattice form and that it have an apparent density of at least about 3.2, as measured by the well-known kerosene immersion method.

In commercial practice, such high density periclase is conventionally produced either from magnesia (ordinarily in divided form and derived e.g. from naturally occurring magnesite or brucite) or from a slurry of magnesium hydroxide prepared by precipitation from sea water or brines rich in magnesium salts. These starting materials are converted to periclase magnesia by a high temperature calcination step (commonly referred to as dead burning), which is desirably performed in a conventional rotary kiln for ease and convenience of operation. It is sometimes preferred to briquette the starting material prior to dead burning; this briquetting step, by providing close interparticle contact, promotes full conversion to periclase and enhances the sintering action necessary for obtaining an acceptable apparent density. The briquetted form of the resultant periclase also facilitates controlled reduction to the precise particle size grading necessary for the preparation of high quality refractory products.

Various difficulties and inconveniences are encountered in the foregoing procedures. For example, briquetting of the starting materials requires application of pressures approaching 40,000 p.s.i. and hence necessitates the use of special high pressure briquetting presses; moreover, the magnesium hydroxide starting material cannot be briquetted as such, but must be dried and lightly calcined to effect conversion to magnesia prior to briquetting. With or without briquetting, the attainment of an acceptable apparent fired density (i.e. equal to or above 3.2) in the produced periclase ordinarily requires dead burning at a temperature above 3000° F. Furthermore, to attain an apparent fired density of 3.4 or better, as required for particular uses of periclase, it is necessary either to provide a dead burning temperature of at least about 3200° F., which is close to the upper limit of temperature obtainable in a rotary kiln, or to add a sintering agent to the material prior to dead burning.

These difficulties are particularly acute when the material to be converted to periclase is of very high purity, e.g. having a content of 96% magnesia or above on an ignited basis. Briquetting of such materials can only be accomplished under conditions of elevated temperature, even at the high pressures referred to above. Again, the production of periclase containing at least about 96% magnesia and having an apparent density of at least about 3.4, as desired for certain purposes, requires a dead burning temperature considerably in excess of the aforementioned upper limit of rotary kiln equipment. Hence other and less convenient equipment (such as a shaft kiln) must be employed to attain such high-density product from a high-purity starting material, unless the temperature requirement is reduced by introducing a sintering agent with concomitant impairment in the purity of the product.

The present invention in a broad sense concerns the provision of a form of magnesium hydroxide having unusually high reactivity and markedly superior briquetting and sintering properties, which render it especially advantageous for use as a starting material in the production of periclase (obviating the difficulties referred to above), as well as for a variety of other purposes. The invention further and particularly embraces the discovery that magnesium hydroxide in such form, having the foregoing properties, is obtained by hydrating magnesia which has been partially recrystallized in a calcination step performed under conditions effective to bring the magnesia at least part way to the state in which the periclase lattice is predominant, and to produce some crystal growth therein.

The magnesium hydroxide product of the invention is a finely particulate material, of apparently crystalline character, consisting of magnesium hydroxide particles of minus 325 mesh size on the Tyler scale (Standard U.S. scale), i.e. particles 44 microns or smaller in size, the openings of a 325 mesh Tyler screen being 44 microns across. On the basis of present understanding and present interpretation of electron micrographs, these magnesium hydroxide particles are believed to be of jagged, angular configuration, and in at least some cases to be agglomerates of still smaller subparticles; the term "particle" is used herein to include particles which in microstructure are themselves agglomerates. Owing to the small particle size, this form of magnesium hydroxide can be pumped in the dry state, facilitating handling. In addition, this minus 325 mesh size product is further characterized by the special advantages for periclase production referred to generally above.

Thus, in particular, magnesium hydroxide in the present form can be directly briquetted with conventional (comparatively low-pressure) briquetting presses, whereas other forms of magnesium hydroxide must be converted to magnesia prior to briquetting and can then be formed into satisfactory briquettes (i.e. briquettes which hold together for their intended use) only at high pressures, as mentioned above. That is to say, the present form of magnesium hydroxide can not only be directly briquetted, but can be thus briquetted at advantageously low pressures. Although it is impossible to determine the true pressure developed in a commercial briquetting press (wherein the material to be briquetted is compacted between rolls having paired cavities to shape the briquettes), the pressure necessary to form a material into briquettes which hold together can be determined by compacting the material in a conventional plunger or piston-type laboratory press used for making ceramic bodies, e.g. such as the model CT 709 press manufactured by Soil Test Incorporated. It has specifically been found that the present magnesium hydroxide product can be formed directly into satisfactory briquettes, on a press of the latter type, at a pressure of not more than about 30,000 p.s.i.; as will be appreciated, this value of briquetting pressure, as measured on such a laboratory press, is a true measure of a property of the material.

It has further been found that in dead burning the present form of magnesium hydroxide, periclase formation and crystal growth are promoted at lower temperatures than in the dead burning of conventional starting materials so that an apparent density of 3.2 or better is attained at dead burning temperatures substantially below 3000° F., e.g. below 2500° F.; in particular, periclase magnesia of very high apparent density (3.4 or better) and very low apparent porosity can readily be obtained from such form of magnesium hydroxide by dead burning at temperatures of e.g. not more than about 3000° F., conveniently below the upper temperature limit of conventional rotary kiln equipment. In this connection it may be explained that the apparent density of a material is its mass per unit volume including volume occupied by closed pores; the apparent density of periclase may be approximately determined using kerosene immersion techniques, and more accurately measured with and air pycnometer. Apparent porosity, correspondingly, is the percent of the total volume of the material occupied by closed pores (whereas true porosity is the percent of volume occupied by both open and closed pores). Bulk density is lower than apparent density, being the mass per unit volume including volume occupied by both closed and open pores; bulk density may be approximately determined by mercury immersion techniques. All values of density expressed herein are in grams per cubic centimeter.

In its more specific aspects, the invention is particularly directed to a magnesium hydroxide product in the form described, having a very high purity, e.g. a content of at least about 96% magnesia on an ignited basis, and to a method providing such high purity product. The latter product can be briquetted at the low pressures mentioned above, i.e. at not more than about 30,000 p.s.i., without requiring any special temperature conditions. Furthermore, it can be converted to high purity periclase having an apparent density above 3.2 and low apparent porosity by dead burning at temperatures substantialy below 3000° F., and at a dead burning temperature of about 3000° F. it attains an apparent density of 3.4 or better, even in some instances exceeding 3.5 (and thus approaching the theoretical value of periclase apparent density, 3.58). In other words, from this material high purity periclase of very high density and low porosity can readily be produced by direct dead burning in a rotary kiln at conveniently low temperatures without contamination by the addition of sintering agents. It will be understood, of course, that the form of magnesium hydroxide provided by the present invention may also be used with advantage for a variety of other purposes, because of its unusual properties as referred to above.

As mentioned above, the present form of magnesium hydroxide is a crystal aggregation of −325 mesh size agglomerates or particles, believed to be of angular, jagged configuration. This jagged configuration of the particles promotes an interlocked structure with line-to-line contact between particles, i.e. over an extended interparticle contact surface area, when the particles are compacted together. In contrast, magnesium hydroxide precipitated, e.g. from sea water forms smoothly rounded conglomerates, resulting in point-to-point contact rather than line-to-line contact between particles. It is believed that the facility with which the present form of magnesium hydroxide can be briquetted is attributable to this feature of line-to-line contact. The conversion of this magnesium hydroxide to periclase of high apparent density and low porosity at advantageously low dead burning temperatures is also believed to be due to the greatly augmented interparticle contact area provided by the interlocking structure and line-to-line character of contact referred to above (and in particular to result from a rapid sintering in the solid state, caused by such line-to-line contact), since the apparent density of the produced periclase is a function not only of time and temperature but also of the area of contact between the particles treated.

The method of producing this form of magnesium hydroxide in accordance with the present invention may employ as a starting material either magnesia or a compound which can be converted to magnesia by calcination. Examples of the latter compounds are magnesium hydroxide, e.g. as derived from sea water or brine, or in the naturally occurring mineral form known as brucite, and magnesium carbonate, e.g. as the mineral magnesite. Preferably the starting material is provided in granular form.

This material is subjected initially to a calcination step effective to produce magnesia in a condition of at least partial periclase development, i.e. magnesia which has been brought at least part way to the state wherein the periclase lattice is predominant, and in which some crystal growth has taken place. Such calcination step involves heating the magnesia to a temperature above 1500° F., e.g. in a range between about 1500° F. and about 2700° F. It is especially preferred to employ a calcination temperature of at least about 1700° F., calcination temperatures of the latter value and above having been found to have important economic and other advantages particularly in enabling attainment of a very high percentage recovery of the ultimate minus 325 mesh hydroxide product, as hereinafter more fully explained. A presently preferred practical range of calcining temperatures for the performance of the present method is that between about 1800° F. and about 2500° F. Conveniently, the heating or calcining step is performed in conventional rotary kiln equipment, with a dwelling time in the hot zone of e.g. between about 10 minutes and about 5 hours, a dwelling time of between about 20 minutes and about 1 hour being presently preferred.

It will be understood that within the ranges indicated above, the optimum conditions of time and temperature are dependent to some extent on the composition of the particuar material employed. For example, the preferred temperature range for calcination of granular magnesia of natural brucite origin is between about 1900° F. and about 2300° F.

To provide the magnesium hydroxide product of the present invention, the partially recrystallized magnesia obtained by the foregoing calcination step is subjected to hydration, e.g. with steam or water. This hydration step may be performed under various conditions, either at atmospheric pressure or at an elevated pressure in an autoclave vessel, the optimum conditions of hydration being selected with regard to the particular material employed. The conditions of hydration, and the additions of water or steam, are controlled to yield a dry magnesium hydroxide product.

The granules or particles of partially recrystallized magnesia which are subjected to this hydration step are, as explained above, in a state of partial periclase development. Since the lattice of the periclase form occupies a smaller volume than the lattice of the uncalcined or hydrate form, the hydration of the magnesia granules results in expansion of their volume. This volume expansion creates sufficient mechanical strain to burst the granules, yielding the magnesium hydroxide as an exfoliated product, i.e. in the form of extremely fine particles. In particular, as a result of the exfoliation occurring incident to the hydration, a very large proportion (ordinarily more than 80%) of the produced magnesium hydroxide is in particles of minus 325 mesh size. Impurities other than lime values carried with the magnesia, however, remain as relatively coarse particles in the hydrate. It will be understood that the minus 325 mesh fraction of the hydrate constitutes the form of magnesium hydroxide referred to above, i.e. it is these minus 325 mesh particles that have the advantageous briquetting, sintering and other properties previously described.

A very high recovery of high purity magnesium hydroxide may be obtained by mechanically classifying the hydrate (in any convenient manner) to separate out and concentrate the minus 325 mesh particle size fraction of the hydrate. This latter classification constitutes an additional and important step in the process of the present invention, in a specific aspect thereof; one important feature of advantage of the invention, in this aspect, resides in such facile provision of a high recovery of high purity magnesium hydroxide. It will be appreciated that this high percentage recovery of high purity product is attributable to the partial periclase development effected in the calcination step of the process, since as explained the exfoliation (which yields the magnesium hydroxide in minus 325 mesh particle size) in the hydration step occurs because the magnesia subjected to hydration has a periclase lattice structure. As noted above, the percentage recovery of minus 325 mesh hydroxide product is very markedly superior when the calcination step is performed at temperatures of about 1700° F. or higher; this result is believed to be due to superior effectiveness of the latter calcining temperatures in producing the aforementioned periclase development.

The purity of the minus 325 mesh fraction of the hydrate has been found to be dependent on the proportion of lime values present in the treated material. That is to say, compounds such as calcium carbonate and calcium hydroxide (Portlandite), if present in the starting material, are converted wholly or partially to calcium oxide in the calcination step, at the high calcination temperature employed; the calcium oxide in turn is converted to finely particulate slaked lime (calcium hydroxide) in the hydration step, and is present in the minus 325 mesh fraction of the hydrate. At calcination temperatures below about 1700° F., the calcination of lime values is only partial. At calcination temperatures above 1700° F., however, and thus at temperatures in the preferred range for the present process, substantially all the lime values present in the starting material are recovered in the latter product.

Accordingly, to obtain a high purity product it is presently preferred either to employ in the process of the invention a starting material substantially free of lime impurities, or to beneficiate the material (before, or in conjunction with, performance of the process) to remove lime impurities therefrom. In the absence of beneficiating procedures, a preferred or practical upper limit for lime impurities in starting materials employed with the present process is about 10% calcium oxide on an ignited basis.

If there is free lime present in the minus 325 mesh magnesium hydroxide product of the present invention, it can be leached out by water at room temperature; i.e. calcium oxide or calcium hydroxide can be thus removed, with the aid of a filter, which retains the magnesium hydroxide. Such filtration can be readily accomplished because the present magnesium hydroxide product, e.g. made up into a 10% solids slurry, settles and filters rapidly and effectively without the need for any surface-active agents. As will be appreciated, the foregoing leaching procedure is an alternative way of improving any particular product according to the invention with respect to lime.

Presence of lime values in the aforementioned proportion (i.e. up to about 10% CaO, on an ignited basis) in the starting material may reduce the purity of the minus 325 mesh fraction of the hydrate to about 90% magnesium oxide on an ignited basis. Assuming, however, that the starting material used is substantially free of lime values, or as beneficiated to effect their removal, the performance of the present process (including the last-mentioned mechanical classification step) yields an aggregate of minus 325 mesh magnesium hydroxide particles having a purity of at least about 96% magnesia on an ignited basis and representing a recovery of better than 80% of the magnesia subjected to the hydration step. Such high purity product, consisting of minus 325 mesh size particles believed to be of angular jagged configuration as mentioned above, has the advantageous properties previously mentioned with respect to ease of briquetting, periclase formation and attainment of high apparent densities and low porosity on dead burning at comparatively low temperatures, and thus has particular use as a starting material for the production of high density, high purity periclase.

The details of particular appearance of the minus 325 mesh particles or agglomerates of the product of the present invention sometimes vary depending on the nature of the starting material employed, i.e. whether brucitic ore, or some other source of magnesia, but they all exhibit the behavior that is believed to be attributable to the jagged angular shape referred to above. In general, when brucite or brucitic ore is the starting material for the present method, each of the minus 325 mesh magnesium hydroxide particles of the product is itself an agglomerate of still smaller subparticles. The range of sizes of these agglomerates, in a typical sample of the present product prepared from such brucitic ore, is indicated below:

| Less than: | Percent by weight |
|---|---|
| 40 microns | 97 |
| 30 microns | 92 |
| 20 microns | 69 |
| 8 | 19 |

Many of the individual particles that make up the agove agglomerates are about 0.1 micron in size.

In one exemplary embodiment of the method of the present invention, such method is employed in the beneficiation of a brucitic ore of a type found, e.g., in certain parts of Canada, comprising granules of brucite in a matrix of calcium carbonate and containing small quantities of other impurities including silicates, alumina, and iron oxide. A conventional procedure for beneficiating such ore to remove the lime values therefrom is the so-called Goudge process, described in Canadian Patent No. 388,635. The latter process includes the steps of calcining the ore, preferably in granular form, and preferentially hydrating the calcium oxide present in the calcine to effect its removal as slaked lime. The present method, as applied to the described ore, incorporates the foregoing steps of the Goudge process, with the calcining step performed as the calcining step of the present method.

Thus the brucitic ore, as initially crushed to granular form to attain a maximum granule dimension of e.g. about 2 inches, is calcined in a rotary kiln at a temperature between about 900° C. (1655° F.) and about 1600° C. (2732° F.), the value of 900° C. being in a practical sense the lower temperature limit for performance of the calcining step of the Goudge process, as representing the minimum temperature necessary to effect assured complete calcination of the calcium carbonate. This calcination is carried forward to convert the brucite to magnesia and effect at least partial periclase development therein while causing the calcium carbonate of the matrix to decompose into calcium oxide. It is presently preferred to perform this calcination at a temperature of between about 2000° F. and about 2200° F. with a total retention time of between about 2½ and about 3½ hours.

Further in accordance with the Goudge process, the resultant calcine is subjected to a partial hydration step which enables separation of the calcium oxide by effecting preferential hydration of the latter to slaked lime while leaving the calcined brucite granules mainly unaffected. To this end, the hydration temperature is preferably maintained below 212° F., and in addition the quantity of water employed in the partial hydration is controlled to provide the lime in dry form. After this operation, the lime is separated out; the remaining granules (now chiefly comprising partially recrystallized magnesia but having hydrated outer surfaces) are washed to remove adherent lime dust, and dried.

With the lime thus separated and removed, the calcined brucite granules are fully hydrated under pressure with water or stream, e.g. in an autoclave vessel, to convert them to magnesium hydroxide, the addition of water or steam being controlled to provide a dry product within a reasonable length of time. This hydration can be carried out under fairly wide conditions of pressure but to insure that the heat of reaction is released rapidly enough to cause autogenous reaction the steam pressure in the vessel is preferably maintained at not less than about 50 pounds per square inch gauge (at which pressure the temperature in the vessel is 297° F., as calculated from steam tables). In a typical operation hydration is substantially completed in about 25 minutes at a pressure of about 150 p.s.i. gauge with a corresponding temperature of about 365° F.

This hydration yields an exfoliated magnesium hydroxide product, due to expansion of the calcined brucite granules, as explained above. On the other hand, the siliceous impurities present in the treated material are relatively unaffected and consequently are liberated by the exfoliation as larger size particles, facilitating subsequent separation. In particular, the impurities present in the hydrated particles are found to be primarily in the size range plus 325 mesh minus 20 mesh.

Accordingly, the hydrate is classified (by any convenient mechanical separating operation, such as air classification or sifting) as to particle size, to separate out and recover a minus 325 mesh fraction. Since the magnesium hydroxide is in extremely fine particles in the hydrate, the latter fraction is an aggregate of very high purity magnesium hydroxide, e.g. above 96% magnesia on an ignited basis, and represents a high percentage recovery of the magnesia in the calcine. This magnesium hydroxide is the product of the present invention, i.e. the hydrate of partially recrystallized magnesia, comprising an aggregate of minus 325 mesh particles having the high reactivity and superior briquetting and sintering properties referred to above.

It will be understood that in the foregoing procedure the intermediate partial hydration step is included, in accordance with the Goudge process, to remove the lime values present in the particular ore treated, since if not thus removed a proportion of these lime values would disintegrate in size to minus 325 mesh particles during the full hydration step and would accordingly be present as a contaminant in the final minus 325 mesh product. Such partial hydration is not required when the starting material used in the present method is substantially free of lime impurities.

The following specific examples are set forth in further illustration of the features and advantages of the invention:

Example I

Brucitic ore of the foregoing type, i.e. comprising brucite granules in calcium carbonate matrix, was crushed to granular form and a fraction selected for high brucite content was calcined at a temperature of between about 2100° F. and about 2200° F. with a total retention time of about 3 hours. The resultant calcine was subjected to the successive steps of partial hydration to remove lime values, full hydration under pressure, and mechanical classification of the resultant hydrate, all as described above. The analysis of this material at various stages in the process is indicated in the following table, all results (with the exception of the ore fed to the kiln) being on a loss-free basis:

| Material | Percent recovery | Chemical Analysis, percent ||||| 
|---|---|---|---|---|---|---|
| | | MgO | SiO$_2$ | CaO | Other oxides | Ignition loss |
| Ore as fed to kiln | 100 | 22.7 | 3.6 | 35.1 | 0.9 | 38.7 |
| Granular calcine (after partial hydration) | 16 | 84.3 | 8.1 | 5.3 | 2.3 | 0 |
| Final hydrate: | | | | | | |
| −325 mesh fraction | 11.5 | 96.2 | 0.3 | 2.2 | 1.3 | 0 |
| +325 mesh fraction | 4.5 | 56.0 | 26.7 | 12.7 | 4.6 | 0 |

The other oxides in the foregoing table are ferric oxide, alumina, and titanium oxide.

If the plus 28 mesh fraction of the magnesia granules remaining after the partial hydration step of the Goudge process is separated, and the final hydration performed separately on this plus 28 mesh fraction, a slightly higher purity product is obtained:

| Fraction | Percent recovery | Chemical Analysis, percent ||||| 
|---|---|---|---|---|---|---|
| | | MgO | SiO$_2$ | CaO | Other oxides | Ignition loss |
| Hydrate of +28 mesh fraction: | | | | | | |
| −325 mesh | 10 | 96.9 | 0.2 | 1.6 | 1.3 | 0 |
| +325 mesh | 2 | 63.4 | 23.0 | 9.3 | 4.3 | 0 |

Thus the minus 325 mesh fraction of the final hydrate (with or without separation of the plus 28 mesh fraction prior to hydration) was a magnesium hydroxide having a purity of above 96% magnesia on an ignited basis, and constituted the product of the present invention, being readily dead burned to an apparent density of about 3.4. The small amounts of other substances present in this product were found to form harmless or even desirable impurities such as di- and tri-calcium silicate and brownmillerite ($4CaO \cdot Al_2O_3 \cdot Fe_2O_3$), the latter being a good dead burning or mineralizing agent.

Example II

About 200 tons of magnesium of natural brucitic origin were produced in accordance with the Goudge process, by procedure wherein the brucitic ore was calcined at 2000° F. in a conventional rotary kiln with a total retention time of about 3 hours and a retention time in the hot zone of between 20 and 30 minutes, and the lime removed by the partial hydration step of the Goudge process, as described above. The resultant calcine, after removal of lime, was hydrated in an autoclave at 135 p.s.i. (gauge), to produce magnesium hydroxide. The minus 325 mesh fraction of this magnesium hydroxide was then separated and briquetted on a conventional Komarek-Greaves briquetting press. The material analyzed between 96.5% and 97% magnesia on an ignited basis.

A 150 ton lot of these magnesium hydroxide briquettes was dead burned in a rotary kiln at a temperature between 3000° F. and 3200° F., to convert the magnesium hydroxide to periclase. The apparent density of the produced periclase was ascertained to be between 3.40 and 3.49 by mercury immersion techniques.

Example III

Magnesium hydroxide produced as in Example II was dead burned in a stationary furnace at 3000° F. The apparent density of the produced periclase, as measured by kerosene immersion and air pycnometer techniques, was equal to or above 3.5.

Example IV 20 to 30 tons of magnesium hydroxide briquettes, prepared as in Example II above, were dead burned in a rotary kiln at a temperature ranging between 2300° F. and 2500° F. By kerosene immersion techniques, the apparent density of representative samples of the resultant periclase was found to lie between 3.28 and 3.30.

Example V

The method of the present invention was performed using as the starting material two pounds of Australian magnesite having the following analysis (on an ignited basis):

| | Percent |
|---|---|
| MgO | 46.6 |
| SiO$_2$ | 0.4 |
| CaO | 0.8 |
| Loss on ignition | 51.8 |
| Other impurities | 0.4 |
| | 100.0 |

This magnesite was calcined at 1900° C. for one hour, and the calcine was hydrated in an autoclave for three hours at 30 p.s.i. (gauge) steam pressure. Thereafter the minus 325 mesh fraction of the hydrate (which was the magnesium hydroxide product of the present invention) was separated and compacted into briquettes at a pressure of 30,000 p.s.i. and dead burned in a stationary furnace at 1650° C. (about 3000° F.) for 3 hours. The bulk density of the produced periclase, as measured by mercury immersion technique, was 3.33.

It is to be understood that the present invention is not limited to the specific features and embodiments hereinabove set forth, but may be carried out in other ways without departure from its spirit.

We claim:

1. In a method of preparing an aggregate of magnesium hydroxide particles from an ore containing granules of brucite, the steps of calcining said ore at a temperature of at least about 1500° F., hydrating the calcined material under pressure to yield dry exfoliated magnesium hydroxide particles finer than about 325 mesh, and separating and recovering as product from said hydrate, by size classification, a fraction of particles finer than about 325 mesh, said fraction comprising said magnesium hydroxide particles.

2. A method according to claim 1, wherein the temperature at which said ore is calcined is at least 1700° F.

3. A method according to claim 2, wherein said temperature is between about 1900° F. and about 2300° F.

4. In a method of preparing an aggregate of magnesium hydroxide particles from an ore containing granules of brucite in admixture with calcium carbonate and minor proportions of impurities, the steps of calcining said ore at a temperature of at least about 1650° F. to convert said brucite to magnesia and said calcium carbonate to calcium oxide, preferentially hydrating the calcium oxide in the calcined ore to convert said oxide to calcium hydroxide, removing said calcium hydroxide from said calcined ore, hydrating said calcined ore under pressure to convert said magnesia to exfoliated magnesium hydroxide including magnesium hydroxide particles finer than about 325 mesh, and separating the hydrated ore by size classification into a first particle fraction consisting essentially of said magnesium hydroxide particles finer than about 325 mesh and a second fraction of particles coarser than 325 mesh and containing said impurities, for recovery of said first fraction as a fine, high purity magnesium hydroxide product.

5. A method according to claim 4, wherein said hydration of said calcined ore is conducted at a steam pressure of not less than about 50 pounds per square inch gauge.

6. A method according to claim 4, wherein said hydration of said calcined ore is conducted as a dry hydration.

References Cited

UNITED STATES PATENTS

| 2,208,185 | 7/1940 | Goudge | 23—201 |
| 2,219,725 | 10/1940 | Seaton | 23—201 X |
| 2,309,168 | 1/1943 | Corson | 23—188 |
| 2,409,546 | 10/1946 | Corson | 23—188 |
| 2,640,759 | 6/1953 | Hughey | 23—201 |
| 2,658,814 | 11/1953 | Woodward | 23—201 |
| 2,881,048 | 4/1959 | Bieneck et al. | 23—201 X |
| 2,898,194 | 8/1959 | Eells et al. | 23—201 |
| 3,091,514 | 5/1963 | Leatham et al. | 23—201 |

FOREIGN PATENTS

| 388,635 | 5/1940 | Canada. |
| 455,537 | 3/1949 | Canada. |
| 518,692 | 11/1955 | Canada. |
| 529,614 | 11/1940 | Great Britain. |

OTHER REFERENCES

Dana: Textbook of Mineralogy, John Wiley and Sons, Inc., N.Y., 1932, pages 507 and 508.

OSCAR R. VERTIZ, *Primary Examiner.*

G. T. OZAKI, *Examiner.*